UNITED STATES PATENT OFFICE.

RUDOLPH MOLL, ARNOLD ISENHAGEN, AND CARL RETTMEYER, OF HAMBURG, GERMANY.

PROCESS OF PRESERVING MARCIPAN.

995,625. Specification of Letters Patent. Patented June 20, 1911.

No Drawing. Application filed March 21, 1911. Serial No. 615,920.

*To all whom it may concern:*

Be it known that we, RUDOLPH MOLL, ARNOLD ISENHAGEN, and CARL RETTMEYER, subjects of the German Empire, residing at 31° Beim Strohhause, Hamburg, Germany, have invented certain new and useful Improvements in Processes for Preserving Marcipan and Marcipan-Like Compounds, of which the following is a specification.

The present invention relates to a process for preserving marcipan and marcipan-like compounds.

The process of making marcipan or marcipan-like compounds is known. These compounds were hitherto sold in a fresh state only, as for various reasons it was not possible to find a suitable means for their preservation. The fresh article will not remain eatable for long. It quickly becomes dry, hard or covered with mildew or fungi and must then be considered as detrimental to the health.

This invention consists in preserving this fresh compound by the use of a special process in such a manner, that it can be guaranteed to last for years.

The marcipan or marcipan-like compound, prepared of particularly good material is tightly pressed by suitable means free of all air-bubbles into a glass vessel, so that it is flush with the upper rim of the vessel. Then the compound is covered with a layer of acid-proof paper or cardboard whereupon the vessel is closed with a tightly fitting cover. The thus filled and sealed vessel or several such vessels at a time are heated for about 10 to 30 minutes in a steam or water bath to a temperature of 120° C. and then left to cool slowly.

The bitter almonds for instance employed in the manufacture of marcipan or marcipan-like compounds contain small quantities of prussic acid, which will destroy the tins in which the preserves are kept, by the prussic acid causing the tins to rust so that the contents will soon spoil. For this reason glass vessels are employed in the present process, whereby the further advantage is obtained that the compound will not have to be immediately and completely removed on the vessel being opened as it is the case when tins are used, but may be left in the glass jar and be used down to the last bit.

By the present preserving process neither the flavor nor the aroma of the compounds will be affected.

We claim:

A process for preserving marcipan and marcipan-like compounds consisting in the said compounds being pressed, into a glass vessel until it is flush with the top edge of said glass vessel, then being covered with a layer of acid-proof paper or cardboard, whereupon the glass vessel is tightly closed with a well fitting lid, and then heated in a steam bath, a water bath or the like for a period from 10 to 30 minutes to a temperature of 120° C.

In testimony whereof we affix our signatures in presence of two witnesses.

RUDOLPH MOLL.
ARNOLD ISENHAGEN.
CARL RETTMEYER.

Witnesses:
WILHELM GRAEFE,
ERNEST H. L. MUMMENHOFF.

---

Copies of this patent may be obtained for five cents each, by addressing the "Commissioner of Patents, Washington, D. C."